AMPLIFIER SYSTEM

Filed July 26, 1952 2 Sheets-Sheet 1

INVENTORS
BEN H. TONGUE
ISAAC S. BLONDER
BY Rines and Rines
ATTORNEYS

INVENTORS
BEN H. TONGUE
ISAAC S. BLONDER
BY
Rines and Rines
ATTORNEYS

United States Patent Office
2,761,022
Patented Aug. 28, 1956

2,761,022

AMPLIFIER SYSTEM

Ben H. Tongue and Isaac S. Blonder,
Mount Vernon, N. Y.

Application July 26, 1952, Serial No. 301,082
10 Claims. (Cl. 179—171)

The present invention relates to electric amplifier systems and more particularly to electric amplifier systems in which a plurality of different signals may simultaneously be supported.

It has heretofore been proposed to feed a plurality of different signals, such as different-frequency television channel programs, by way of a plurality of amplifiers to successive intermediate points along a distribution transmission line. This process is commonly termed "mixing" the signals, and the amplifier-transmission line system is often referred to as a "mixer," where the terms "mixing" and "mixer" do not here mean conventional non-linear heating or heterodyning, but, rather, merely the simultaneous and independent feeding of the signals to a common line where the signals maintain their identity and may be fed to a utilization circuit such as a television receiver or distribution system. Such devices have been subject to several disadvantages including loss of gain produced in connecting the plate of the last channel amplifier of the system to the effective low impedance of the line, the relatively low-voltage output obtainable from this channel amplifier, and the relatively poor selectivity provided in the output circuit of each channel amplifier.

An object of the present invention is to provide a new and improved amplifier system of this character in which greater gain, materially increased signal amplitude and improved selectivity are provided.

Other and further objects will be explained hereinafter and will be more particularly pointed out in the appended claims.

In summary, the invention relates to an electric system having, in combination, a load of predetermined impedance, preferably in artificial transmission line, and a plurality of amplifiers, one for amplifying each of a plurality of predetermined radio frequencies within a predetermined band. A plurality of input and output circuits are provided, one input circuit and one output circuit corresponding to each amplifier, and the predetermined radio frequencies are applied to the corresponding input circuits, preferably through multiply resonant networks. Each output circuit has series inductance and shunt capacitance including the inherent output capacitance of the corresponding amplifier, and the output circuits are connected between the corresponding amplifiers and the load, preferably at successive points along the artificial transmission line intermediate its ends. The impedance of the said series inductance of each output circuit at the corresponding predetermined radio frequency is adjusted to transform the impedance presented to that amplifier by the load, such as the line, up to an impedance greater than the said predetermined impedance of the load, and the value of the said shunt capacitance is adjusted to resonate with the said series inductance at the corresponding predetermined radio frequency. Preferred constructional details are hereinafter presented.

Figure 1:
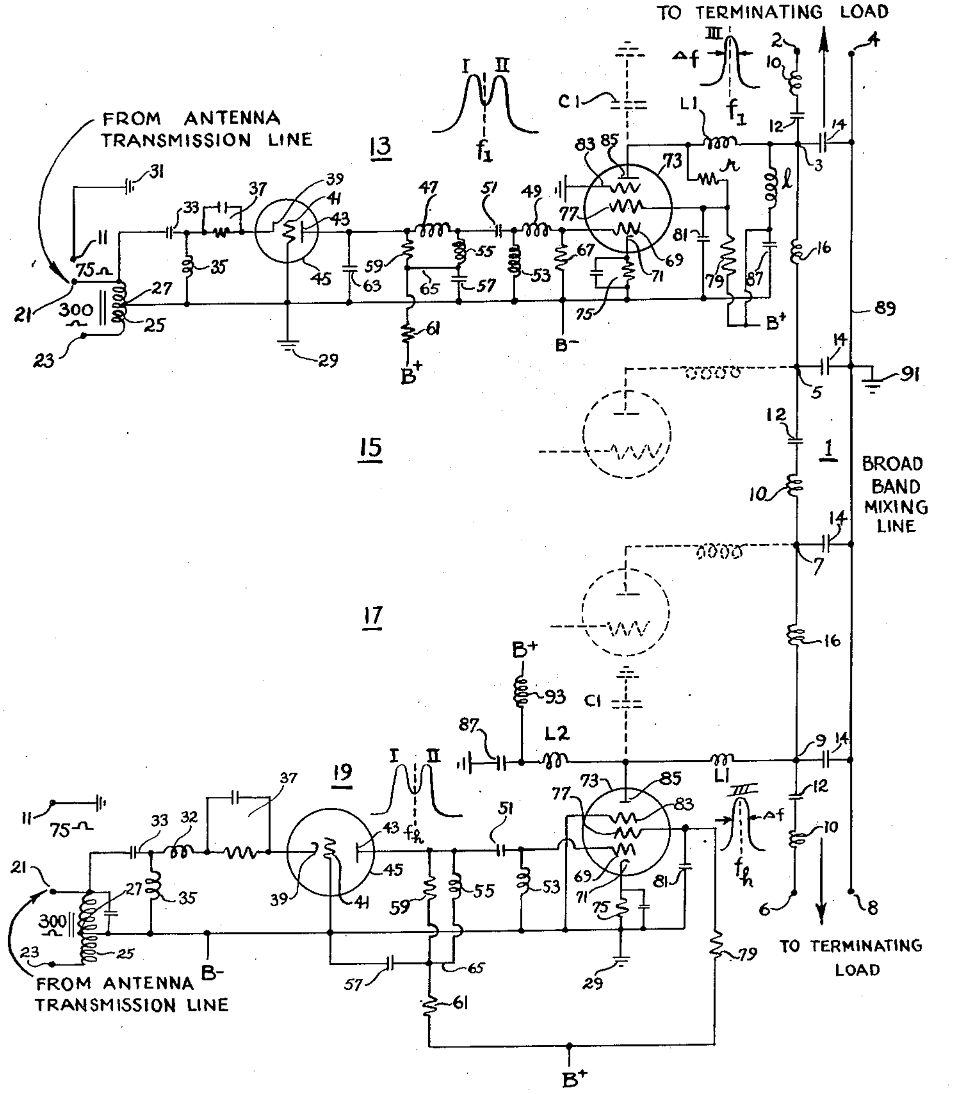
Figure 2:
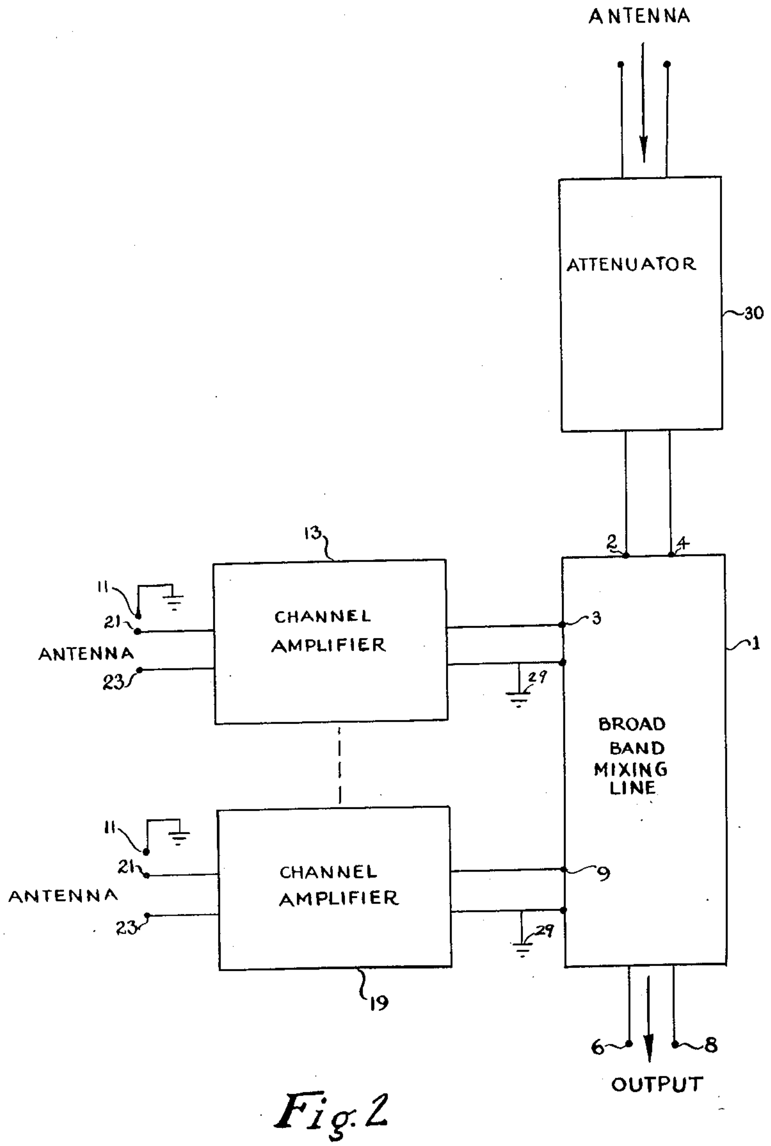

The invention will now be described in connection with the accompanying drawing, Fig. 1 of which is a circuit diagram of the invention in preferred form; and Fig. 2 is a block diagram of a modification.

Referring to Fig. 1, a broad-band artificial transmission line is shown at 1, to intermediate points 3, 5, 7 and 9 of which a plurality of signal amplifier channels 13, 15, 17 and 19, such as amplifiers tuned to the different television channel frequencies, are respectively connected. While only four channels are shown, and two of these are represented by dotted lines to indicate that they may or may not be used, this is only for illustrative purposes, it being understood that more or fewer channel amplifiers and a longer or shorter line 1 may be used. The line 1, however, while shown as a preferred artificial line comprising coils and condensers, later discussed, may also be of different form, such as an actual physical transmission line or other load having appropriate external artificial-line inductances and condensers, as later explained. Though the invention will hereinafter be described in connection with the application of the present invention to television signals, moreover, it is to be understood that the invention is equally useful with other types of signals and frequency ranges.

The channel amplifier 13 is particularly designed for use with the lower present-day television-channel frequencies, say from about 54 to about 88 megacycles. An antenna that may be particularly tuned for such a low-channel frequency, and oriented and properly directionalized to receive the transmissions from that channel transmitter, may be connected by either coaxial or parallel-wire transmission line to the left-hand terminals of the channel amplifier 13. If, for example, a 75-ohm coaxial transmission line is used, connection may be made to terminals 11 and 21; whereas if the antenna is connected to a 300-ohm parallel-wire line, as another example, connection may be effected at terminals 21 and 23. The terminals 21 and 23 are respectively connected to the upper and lower ends of a 300-ohm impedance-matching transformer 25 the center tap 27 of which is grounded at 29. The terminal 11 is also grounded at 31 and thus, effectively, the 75-ohm line connection is made between the upper end 21 of the matching transformer 25 and the grounded center-tap 27 thereof. The stray inductance and capacitance of the matching transformer 25 is utilized in connection with a series condenser 33 and shunt-connected coil 35 of proper value to produce a relatively broad-band filter network tuned to accept, for example, any desired low-frequency television channel within the low television band. The upper and lower terminals of the coil 35 are respectively connected through a resistor-capacitance biasing network 37 to the cathode 39, and directly to the grounded grid 41, of a first, preferably triode, vacuum or electron-tube amplifier stage 45 of the amplifier channel 13, so that the grid-to-cathode interelectrode capacitance of the triode stage 45 also contributes capacity to the broad-band network. This network is of the high-pass type, misterminated at the cathode of the stage 45, and it comprises the input circuit of the stage 45. Any desired low-frequency television signal may be applied therethrough to the stage 45. The frequency of such a signal may be generally represented by the symbol $f_1$.

In the output circuit of the stage 45 connected to the plate 43 thereof, is a multiply resonant network, shown as a double-tuned filter network of the T inductively coupled type, having a first series arm comprising the coil 47 coupled by a condenser 51 to a second series arm comprising the coil 49, and a return or shunt arm comprising the coil 53 connected from the junction of the condenser 51 and the coil 49 to ground, and the coil 55 and condenser 57 in series therewith, connected between the junction of the coil 47 and the condenser 51 and ground. Such a circuit may be tuned to be resonant to two separated frequencies, as is well-known. In accordance with the present invention, this tuning is effected so that the two resonant peaks I and II of the T-network occur at frequencies adjacent to and straddling or overlapping the particular channel frequency $f_1$, as shown in the response curve immediately above the said T-network in Fig. 1. The reason for the use of such a multiply resonant output circuit will later be discussed. Plate supply voltage for the stage 45 is obtained through the resistors 59 and 61 which connects to the positive or B+ terminal of the plate supply source, the negative B− terminal of which may be grounded, as shown. A capacitor 63 is connected between the plate 43 and ground. The junction of the plate resistors 59 and 61 is shown connected by a conductor 65 to the junction between the coil 55 and condenser 57 so that the latter also serves as a decoupling condenser to ground.

Connected between the right-hand end of the series coil 49 and ground is an input circuit grid resistor 67 that connects between the control grid or electrode 69 and the cathode 71 of a second amplifier stage comprising a pentode tube 73. The cathode 71 is provided with a resistor-capacitance decoupling network 75. The screen grid or electrode 77 of the second stage 73 is biased through a resistor 79 from the B+ plate supply terminal, and is decoupled to ground by condenser 81. The suppressor electrode 83 of the pentode is grounded.

If the plate 85 of this stage were merely directly connected to the point 3 of the artificial line 1, as in prior-art systems, before described, the previously mentioned disadvantages of low gain, low signal output and relatively poor selectivity would result. Let it be assumed, for example, that the line 1 has a characteristic impedance $Z_0$ of 75 ohms and that it is properly terminated in 75-ohm loads at its two ends, shown at the top and bottom of the line in Fig. 1, between terminals 2, 4 and 6, 8, respectively. The impedance at the point 3, therefore, will be 37½ ohms. If the tube 73 has a transconductance of, say, 5000 micromhos, the gain of this tube will be about 0.19. This means that the signal output of the tube 73 will be less than one-fifth of the input signal. If, moreover, it be assumed that the maximum current swing of the tube is of the order of ten milliamperes, the output voltage of the tube 73 will be about 0.37 volt peak-to-peak, which is very low.

In accordance with the present invention, through the use of an appropriate output circuit for the tube 73 connected between the tube and the line 1, such poor gain figures and low output signal voltages are greatly improved. This appropriate output circuit comprises a coil L1 connected between the plate 85 and the point 3 of the line 1. The value of the coil L1 is selected so that it will resonate with the output circuit capacity including the plate-to-cathode interelectrode capacitance C1 of the tube, shown dotted, at the particular channel frequency $f_1$ as shown in the response curve III immediately thereabove in Fig. 1. The impedance presented to the plate 85 of the tube 73 at the resonant frequency $f_1$, for example, may be of the order of 940 ohms, many times stepped up from the characteristic line impedance, assuming a Q of the resonant output circuit of five. The Q, of course, is established by the ratio of the inductive reactance of L1 to half of the characteristic impedance $Z_0$ of the line; i. e.

$$Q=\frac{4\pi f_1 L_1}{Z_0}$$

and it is preferably appreciably in excess of unity for the purposes of the present invention. There is thus provided at the plate 85 of the tube 73 a gain of about 4.7. Since there is then approximately a five-times impedance step down from the plate 85 to the line 1 with such a Q of five, the over-all voltage gain of the tube 73 will be about unity as compared with the 0.19 gain before mentioned. The maximum output voltage, moreover, will now be about 2.3 volts peak-to-peak as compared with 0.37 volts—and all this, with the same tube 73, but supplemented with the resonant output circuit of the present invention which transforms the impedance presented to the stage 73 by the line to an impedance appreciably greater than the characteristic impedance $Z_0$ of the line 1.

The use of the series-resonant output circuit $L_1C_1$ of proper value has thus accomplished two advantages: first, it has increased the gain from the channel amplifier stage; and secondly, it has increased the signal amplitude fed from the stage to the line.

Since, moreover, the output circuit of the first stage 45 was a multiple-tuned circuit providing a dip at the resonant frequency $f_1$ and resonant responses on either side thereof, much steeper skirts or side portions of the response curve III of the resonant output circuit of the second amplifier 73 may be produced, as may greater gain be attained, then can be obtained with a single-peak resonant circuit alone. From this point of view, the multiply resonant output circuit of the first stage 45 need not be merely a double-tuned filter network, but may be triple, quadruple or otherwise multiply resonant; and in the case of the double tuning, other types of double-peak networks than the described T-type may also be employed.

Returning to the output circuit of the tube 73 of amplifier channel 13, the output-circuit capacitance $C_1$ is shunted by a resistor $r$ (through the screen by-pass condenser 81) to lower somewhat the Q of the output circuit in order to effect a compromise between sufficient impedance step-up transformation from the line to the plate 85 to produce the above-described results, and maintainance of just sufficient half-power bandwidth $\Delta f$ at the low end of the frequency band with which the channel amplifier 13 is to operate. A further coil $l$, the purpose of which will later be explained, is connected from the point 3 of the line 1 through a by-pass condenser 87 to ground and thus effectively across the line 1 since the right-hand side 89 of the line 1 is also grounded at 91. This coil remains across the line 1 even if no amplifier channel 13 is used. Plate supply voltage from the B+ terminal is fed through the coil $l$ and the coil L1 to the plate 85 of the stage 73. It will be noted that the direct-current resistance in the grid circuit of the stage 73 is low so that no harmful modulation distortion will result from the flow of grid current. The direct-current resistance in the screen circuit of the stage 73 is kept low for the same reason.

If it is desired to mix four or more or less of the low television channel frequencies on the line 1, then four or more or less amplifier channels of the type described in connection with the channel 13 may be connected at points 3, 5, 7, 9, etc. of the line 1. If, on the other hand, it is desired to feed into the line 1 also channel frequencies from the high television band, say from about 174 to about 216 megacycles, a similar amplifier channel 19 is preferably used of slightly modified circuitry, the similar circuit components being given the same reference numerals as those applied to the channel amplifier 13. The principal differences between the amplifier channels 13 and 19 follow. First, in the input circuit of the stage 45, a series coil 32 is utilized so that the input circuit acts as a mis-terminated low-pass filter for passing any of the desired high-channel frequencies $f_h$. Secondly, the multiply resonant output network of the stage 45 is slightly re-arranged as a capacity coupled $\pi$-type double-tuned network comprising the parallel arms 55—57 and 53 and the series arm 51. The network is tuned so that the double response I and II are to the side of and hence adjacent the particular channel frequency $f_h$ with the dip between them occurring preferably at substantially the channel frequency as shown thereabove in Fig. 1. Thirdly, B+ voltage is obtained for the plate 85 of the second stage 73 through further coils L2 and 93. The reason for this is that the gain of the stage 73 in the high television band is usually too low and the output circuit bandwidth $\Delta f$ is too great. The coil L2 serves to reduce the bandwidth $\Delta f$ and to increase the Q and hence the gain of the stage, by reducing the effective output circuit capacity C1.

While little has heretofore been said about the construction of the artificial line 1, it is now in order to treat this matter in the light of the channel amplifier connections thereto. Tracing from the terminals 6 and 8 to the terminals 2 and 4, the right-hand side of the line comprises the conductor 89, grounded at 91, and hence connected to the cathodes 71, through the decoupling networks 75, of the second stages 73 of the channel amplifiers. The left-hand side of the line comprises a first section having a series coil 10, a series condenser 12, a shunt condenser 14; a second section having a series coil 16 and a shunt condenser 14; a third section like the first section; a fourth section like the second section; and a fifth section like the first section, sharing the condenser 14 with the fourth section. The first-section coil 10, condenser 12 and condenser 14, however, are supplemented in the case of the high-frequency channel amplifier 19 by the inductance presented by coils L1 and L2 shunted by C1. This section of the line, therefore, serves as a broad-band or band-pass type filter section. Similarly, in the output circuit of the low-channel amplifier 13, there is provided the series coil L1 and the shunt inductance *l*. It will now be evident that the purpose of the coil *l* is to transform the last section of the line also into a band-pass section. The second section 14, 16, 14 of the line, on the other hand, is a $\pi$ low-pass, constant K-type filter section. Thus, alternate constant K low-pass and band-pass filter sections are provided. While all the sections could be of the band-pass type, the construction of the present invention saves many electrical components that would otherwise be needed to provide an all-band-pass line. It may be shown, moreover, that the particular low-frequency resonant output circuit of the low-channel amplifier 13 is equivalent to the particular high-frequency resonant output circuit of the high-channel amplifier 19, so that whether or not a high or low channel amplifier is connected to the line 1, the line behaves as a band-pass line with a high impedance series-resonant circuit shunted thereacross. With this type of channel amplifier output network, the line 1 always acts like a band-pass line with the before-mentioned shunt series resonant network. At other than the particular channel frequency, however, the shunt series resonant network presents a negligible shunt impedance, so that each channel amplifier output circuit negligibly affects the performance of the other channel amplifiers feeding the line.

Still a further advantage that follows from the circuits of the present invention is that an automatic wave-trap for preventing different channel frequencies from entertaining the other channel amplifiers from the line 1 is provided as a result of the tuned output-circuit construction. One may, furthermore, in the case of a strong signal not requiring amplification, connect an antenna receiving such a signal to the terminals 2, 4 (or 6, 8) of the line 1, as shown in Fig. 2. It is preferable to insert an attenuator 30 between the antenna and the terminals of the line 1, however, among other reasons, to isolate the effect of antennas of impedance variable over the range of frequencies mixed in the line 1.

An output containing all the signals fed from the various channel amplifiers and, in the case of the system of Fig. 2, fed, also, directly into the broad-band line 1, may thus be taken from, for example, the terminals 6, 8, for feeding to a television receiver or distribution system. The output preferably presents a terminating load corresponding to the characteristic impedance of the line 1. If desired, several units of the type shown in Figs. 1 and 2 may be connected in tandem, to provide mixing of as many channel frequencies as may be desired. By making the individual channel amplifiers as plug-in strip assemblies, moreover, different channel amplifiers can be readily substituted along the line 1. Television channel gains in excess of 17 db have been obtained with units of the type illustrated in Figs. 1 and 2 with tubes 45 and 73 of the respective types 6AB4 and 6CB6. Such a flexible mixing system obviates the necessity for antenna rotators, separate boosters, antenna matching devices and other accessory equipment.

Further modifications will occur to those skilled in the art and all such are considered to fall within the spirit and scope of the invention as defined in the appended claims.

What is claimed is:

1. An electric system having, in combination, an artificial transmission line of predetermined impedance comprising successive filter sections, a plurality of amplifiers, one for amplifying each of a plurality of predetermined radio frequencies within a predetermined band, a plurality of input and output circuits, one input circuit and one output circuit corresponding to each amplifier, means for applying the predetermined radio frequencies to the corresponding input circuits, each output circuit having series inductance and shunt capacitance including the inherent output capacitance of the corresponding amplifier, means for connecting the output circuits between the corresponding amplifiers and successively disposed points at the junctions of the successive filter sections along the transmission line intermediate the ends thereof, the impedance of the said series inductance of each output circuit at the corresponding predetermined radio frequency being adjusted to transform the impedance presented to that amplifier at the corresponding point along the transmission line up to an impedance greater than the said predetermined impedance of the transmission line, and being tuned with the said shunt capacitance to cause each output circuit connected to the corresponding transmission-line filter section at the said corresponding point to resonate at the corresponding predetermined radio frequency.

2. An electric system as claimed in claim 1 and in which the artificial transmission line comprises band-pass filter sections for the said band.

3. An electric system as claimed in claim 1 and in which the successive filter sections comprise alternately connected band-pass filter sections for the said band and constant-K low-pass filter sections for the said band.

4. An electric system having, in combination, an artificial transmission line of predetermined characteristic impedance $Z_0$ comprising successive filter sections; a radio-frequency amplifier, an input circuit connected to the amplifier, means for applying radio-frequency energy of frequency $f$ to the input circuit, an output circuit connected between the amplifier and a point at the junction between successive filter sections intermediate the ends of the line, the output circuit having series inductance L and shunt capacitance C including the inherent output capacitance of the amplifier and the impedance presented by the filter section at the said point along the artificial line, the inductive reactive impedance $2\pi f L$ being equal to the capacitive reactive impedance $$\frac{1}{2\pi f C}$$

where $\pi$ is the ratio of the circumference to the diameter of a circle, in order to resonate the output circuit at the said frequency $f$ with a half-power bandwidth $\Delta f$, the series inductance L being adjusted to maintain the ratio $$\frac{2\pi f L}{z_0}$$

appreciably in excess of unity, thereby to transform the impedance presented to the amplifier by the line to an impedance of value appreciably greater than $Z_0$ and simultaneously to render the value $\Delta f$ relatively small.

5. An electric system having, in combination, a plurality of amplifiers, one for amplifying each of a plurality of different predetermined radio frequencies within a predetermined band, an artificial transmission line of predetermined characteristic impedance comprising alternately connected band-pass filter sections for the said band and constant-K low-pass filter sections for the said band, a plurality of input and output circuits, one input circuit and one output circuit corresponding to each amplifier, means for applying the different predetermined radio frequencies to the corresponding input circuits, each output circuit having series inductance and shunt capacitance including the inherent output capacitance of the corresponding amplifier, means for connecting the output circuits of the successive amplifiers of the plurality of amplifiers between the corresponding amplifiers and successively disposed points at the successive junctions between the band-pass and constant-K low-pass filter sections along the artificial transmission line intermediate the ends thereof, the impedance of the said series inductance of each output circuit at the corresponding predetermined radio frequency being adjusted to transform the impedance presented to that amplifier by the transmission line at the said corresponding point therealong up to an impedance greater than the said predetermined characteristic impedance of the line, and the said series inductance being tuned with the said shunt capacitance to produce a resonant response at the corresponding predetermined radio frequency.

6. An electric system having, in combination, a plurality of amplifiers, one for amplifying each of a plurality of different predetermined radio frequencies within a predetermined band, an artificial transmission line of predetermined characteristic impedance comprising alternately connected band-pass filter sections for the said band and constant-K low-pass filter sections for the said band, a plurality of input and output circuits, one input circuit and one output circuit corresponding to each amplifier, means for applying the different predetermined radio frequencies to the corresponding input circuits, each output circuit having series inductance and shunt capacitance including the inherent output capacitance of the corresponding amplifier, means for connecting the output circuits of the successive amplifiers of the plurality of amplifiers between the corresponding amplifiers and successively disposed points at the successive junctions between the band-pass and constant-K low-pass filter sections along the artificial transmission line intermediate the ends thereof, the impedance of the said series inductance of each output circuit at the corresponding predetermined radio frequency being adjusted to transform the impedance presented to that amplifier by the transmission line at the said corresponding point therealong up to an impedance greater than the said predetermined characteristic impedance of the line, and the said series inductance being tuned with the said shunt capacitance to produce a resonant response at the corresponding predetermined radio frequency, and the said input circuits comprising multiply-resonant networks tuned to position the multiple responses thereof to the side of but adjacent the resonant responses of the corresponding output circuits.

7. An electric system having, in combination, a plurality of amplifiers, one for amplifying each of a plurality of different predetermined radio frequencies within a predetermined band, an artificial transmission line of predetermined characteristic impedance comprising successive filter sections, a plurality of input and output circuits, one input circuit and one output circuit corresponding to each amplifier, means for applying the predetermined radio frequencies to the corresponding input circuits, each output circuit having series inductance and shunt capacitance including the inherent output capacitance of the corresponding amplifier, means for connecting the output circuits of the successive amplifiers of the plurality of amplifiers between the corresponding amplifiers and successively disposed points at the successive junctions of the successive filter sections along the transmission line intermediate the ends thereof, the impedance of the said series inductance of each output circuit at the corresponding predetermined radio frequency being adjusted to transform the impedance presented to that amplifier by the transmission line at the said corresponding point therealong up to an impedance greater than the said predetermined characteristic impedance of the line, the said series inductance being tuned with the said shunt capacitance to produce a resonant response at the corresponding predetermined radio frequency.

8. An electric system having, in combination, a plurality of amplifiers, one for amplifying each of a plurality of different predetermined radio frequencies within a predetermined band, an artificial transmission line of predetermined characteristic impedance comprising successive filter sections, a plurality of input and output circuits, one input circuit and one output circuit corresponding to each amplifier, means for applying the predetermined radio frequencies to the corresponding input circuits, each output circuit having series inductance and shunt capacitance including the inherent output capacitance of the corresponding amplifier, means for connecting the output circuits of the successive amplifiers of the plurality of amplifiers between the corresponding amplifiers and successively disposed points at the successive junctions of the successive filter sections along the transmission line intermediate the ends thereof, the impedance of the said series inductance of each output circuit at the corresponding predetermined radio frequency being adjusted to transform the impedance presented to that amplifier by the transmission line at the said corresponding point therealong up to an impedance greater than the said predetermined characteristic impedance of the line, the said series inductance being tuned with the said shunt capacitance to produce a resonant response at the corresponding predetermined radio frequency, and a further inductance connected in the output circuit of at least one of the higher-frequency amplifiers and of sufficient value to cooperate with the said series inductance, the said shunt capacitance and the transmission-line filter section at the corresponding point along the artificial transmission line to operate the said filter section as a band-pass filter section.

9. An electric system having, in combination, a plurality of amplifiers, one for amplifying each of a plurality of different predetermined radio frequencies within a predetermined band, an artificial transmission line of predetermined characteristic impedance comprising successive filter sections, a plurality of input and output circuits, one input circuit and one output circuit corresponding to each amplifier, means for applying the predetermined radio frequencies to the corresponding input circuits, each output circuit having a series inductance and shunt capacitance including the inherent output capacitance of the corresponding amplifier, means for connecting the output circuits of the successive amplifiers of the plurality of amplifiers between the corresponding amplifiers and successively disposed points at the successive junctions of the successive filter sections along the transmission line intermediate the ends thereof, the impedance of the said series inductance of each output circuit at the corresponding predetermined radio frequency being adjusted to transform the impedance presented to that amplifier by the transmission line at the said corresponding point therealong up to an impedance greater than the said predetermined characteristic impedance of the line, the said series inductance being tuned with the said shunt capacitance to produce a resonant response at the corresponding predetermined radio frequency, and a shunt inductance connected in the output circuit of at least one of the lower-frequency amplifiers and of sufficient value to operate the transmission-line filter section at the corresponding point along the artificial transmission line as a band-pass filter section.

10. An electric system as claimed in claim 1 and in which the input circuit of at least one amplifier comprises a multipy-resonant network tuned to position the multiple resonant responses thereof to the side of but adjacent the resonance of the corresponding output circuit.

References Cited in the file of this patent

UNITED STATES PATENTS

| | | |
|---|---|---|
| 2,151,081 | Carlson et al. | Mar. 21, 1939 |
| 2,394,917 | Kallmann | Feb. 12, 1946 |
| 2,426,579 | Peckham | Aug. 26, 1947 |
| 2,523,173 | Winters | Sept. 19, 1950 |
| 2,619,536 | Cotsworth et al. | Nov. 25, 1952 |